United States Patent
Donovan

Patent Number: 6,135,892
Date of Patent: Oct. 24, 2000

[54] METHOD OF FORMING A SHORT POINT ANTI-CROSS THREADING MEMBER

[75] Inventor: Steven P. Donovan, Roscoe, Ill.

[73] Assignee: Textron Inc., Providence, R.I.

[21] Appl. No.: 09/431,608

[22] Filed: Nov. 1, 1999

Related U.S. Application Data

[63] Continuation-in-part of application No. 09/198,792, Nov. 24, 1998.

[51] Int. Cl.[7] .................................................. B21H 3/02
[52] U.S. Cl. .................................. 470/10; 470/68; 72/88
[58] Field of Search .............................. 411/386, 387.4, 411/423, 411, 393, 378; 470/9, 10, 68; 72/88

[56] References Cited

U.S. PATENT DOCUMENTS

| | | |
|---|---|---|
| 1,027,782 | 5/1912 | Watrous . |
| 2,021,704 | 11/1935 | Thatcher . |
| 2,162,891 | 6/1939 | Johnson . |
| 2,531,892 | 11/1950 | Reese . |
| 2,856,617 | 10/1958 | Widmann . |
| 3,318,182 | 5/1967 | Carlson . |
| 3,352,190 | 11/1967 | Carlson . |
| 3,462,114 | 8/1969 | O'Dell, Sr. et al. . |
| 3,537,288 | 11/1970 | Ansingh . |
| 3,683,436 | 8/1972 | Reiland . |
| 3,685,328 | 8/1972 | Carpenter . |
| 4,261,402 | 4/1981 | Stanaitis . |
| 4,630,985 | 12/1986 | Simons . |
| 4,637,764 | 1/1987 | Imai . |
| 4,789,288 | 12/1988 | Peterson . |
| 4,915,560 | 4/1990 | Petrerson . |
| 4,971,502 | 11/1990 | Oh . |
| 4,981,406 | 1/1991 | Weiss et al. . |
| 5,019,080 | 5/1991 | Hemer . |
| 5,064,327 | 11/1991 | Hughes . |
| 5,073,073 | 12/1991 | Kazino et al. . |
| 5,108,240 | 4/1992 | Liebig . |
| 5,209,622 | 5/1993 | Kazino . |
| 5,234,301 | 8/1993 | Grossberndt . |
| 5,320,467 | 6/1994 | Erbes . |
| 5,419,667 | 5/1995 | Avgoustis . |
| 5,836,731 | 11/1998 | Goodwin . |

FOREIGN PATENT DOCUMENTS 1182613 7/1989 Japan .

Primary Examiner—Flemming Saether
Attorney, Agent, or Firm—Trexler, Bushnell, Giangiorgi & Blackstone, Ltd.

[57] ABSTRACT

The present invention provides a novel fastener member, stud, or other threaded member, for engagement with a female member, and the method of assembly thereof. The fastener member has a novel point which facilitates engagement of the fastener member in the threaded bore, greatly reduces the possibility of cross-threading and is especially suited for use in applications involving blind holes or the use of very thin threaded holes. The fastener member has a threaded shank portion. A point is provided at the end of the shank portion and includes an unthreaded radiused portion and a threaded transition portion between the shank portion and the radiused portion. The major diameters of the threads of the transition portion gradually lessen between the opposite ends thereof. The radiused portion can be provided with a truncated end surface.

3 Claims, 10 Drawing Sheets

LEGEND

—●— % GOOD START

CHART GOOD START

SHORT ANTI-CROSS THREAD

| ANGLE (DEGREE) | 0 | 3 | 5 | 6 | 9 | 12 | 15 |
|---|---|---|---|---|---|---|---|
| % GOOD START | 100 | 100 | 100 | 83 | 83 | 0 | 0 |

NOTE: EACH OFF-ANGLE CONDITION HAS A UNIQUE SAMPLE SIZE

METHOD OF FORMING A SHORT POINT ANTI-CROSS THREADING MEMBER

This is a continuation-in-part patent application of Ser. No. 09/198,792 filed Nov. 24, 1998 and entitled "Short Point Anti-Cross-Threading Design.

BACKGROUND OF THE INVENTION

This invention is generally directed to a threaded male fastener member, or other threaded member, having a novel point which facilitates engagement of the fastener member in a threaded bore of a correspondingly threaded female member and prevents the member from cross-threading upon engagement, the method of assembly thereof, and the method of forming the threaded member. Either the member or the female member may be driven, the other member being stationary during the assembly.

During automated or manual assembly of an externally threaded fastener member with an internally threaded member, such as a nut, a tapped bore in a workpiece, or an internally threaded rivet staked to a workpiece, cross-threading can occur at assembly. Cross-threading is an unacceptable condition.

To obtain proper alignment and engagement, the external thread on the fastener member engages with the internal thread in the female member and the external thread then follows the helix path of the internal thread. The mating of the helix angle of the internal and external threads provides an inclined plane which converts input torque into clamp force in the joint.

Cross-threading occurs when a threaded member is engaged with a female member and the threads are not properly aligned when the threads on the threaded member and in the female member first engage. If the external threads on the threaded member and the internal threads in the female member are not properly aligned at the start of the threading operation, the external thread tends to cross over the crest of the internal thread which can produce deformation of the threads and binding or seizing up of the components before the desired depth of engaging is obtained. Unless the threaded member or the female member are manually realigned at this point, the external thread will wedge against the internal thread thus preventing assembly and/or damaging the threads. Cross-threading is a common occurrence in prior art fastener members, and extremely troublesome in automated assembly operations.

In an automated assembly situation, the occurrence of cross-threading can severely affect productivity. In some cases, assembly workers will have to manually engage the fastener member and the female member for a couple of threads, then apply the automated equipment to these pre-aligned fastener members.

Prior art fastener members which have attempted to prevent cross-threading within a tapped bore are provided with various designs. These prior art designs generally involve an asymmetrical point or entry end on the fastener member, with only a portion thereof on the asymmetrical end point or entry end. Examples of prior art fastener members include a "P" Point, a MAT Point, a CTP Point which is disclosed in U.S. Pat. Nos. 4,981,406 and 5,419,667, an ACT Point which is disclosed in U.S. Pat. Nos. 4,789,288 and 4,915,560, and a TRU-START which is disclosed in U.S. Pat. No. 5,064,327.

These prior art fastener members have point lengths, which is defined as the distance from the first full thread to the end of the fastener member, which are substantially longer than a standard machine screw point length. Approximate point lengths for these prior art fastener members are as follows:

MATT thread=10 pitch
GMP-Point=7.2 pitch
TRU-START, short dog point=5.6 pitch
Machine screw=2 pitch Many of the current anti-cross-threading points rely on the point length to provide alignment of the fastener member with respect to the internally threaded hole. Many of the existing machine screw applications cannot tolerate additional point length due to interference in blind tapped holes or other mating components because most applications are replacing standard machine screws. This is particularly important in small business equipment applications, such as, hard drives, cell phones, etc. Also, the additional point length adds additional weight versus a standard machine screw which can be significant in automotive applications.

Applicant's co-pending application, Ser. No. 08/916,164, filed on Aug. 21, 1997 and entitled "Fastener With Anti-Cross-Threading Point and Method of Assembly" greatly reduces the possibility of cross-threading and no-start problems. Applicant has found, however, that in some applications, such as blind holes, the point length of the fastener member disclosed in Ser. No. 08/916,164 is too long making it unsuitable for use in this applications. This present invention overcomes this problem. In addition, in the applications which involve the use of very thin threaded holes, such as in "Tinnerman" type push-on clips, the fastener member disclosed Ser. No. 08/916,164, which uses a long, bulbous point to align itself, is not suitable for use in these applications.

It is desirable to obtain proper alignment, eliminate cross-threading and to provide a fastener member which can be used in thin threaded holes. The fastener member of the present invention provides such a member. The present fastener member minimizes the problems found in the prior art by several novel improvements to prior art fastener members. The structural features of the fastener member of the present invention and manner whereby these features function to attain the improved performance discussed above will become apparent from the discussion as follows, especially with respect to the drawings.

OBJECTS AND SUMMARY OF THE INVENTION

A general object of the present invention is to provide a fastener member, stud or other threaded member, having a novel point on an end thereof which promotes alignment between the fastener member and a threaded bore, facilitates engagement of the fastener member in a threaded bore of a correspondingly threaded female member and resists cross-threading upon engagement, especially in applications involving blind holes or the use of very thin threaded holes.

An object of the present invention is to provide a fastener member which is capable of rapid engagement with a tapped bore so as to reduce the assembly installation time and to improve the ergonomics of a typical installation of a fastener member with a tapped bore, and also which provides improved performance when used with an automated assembly process or equipment.

Another object of the present invention to provide a fastener member which has a large "window of engagement" into a tapped bore by compensating for a condition where the fastener member and the tapped bore are off-angle from each other by providing a self-aligning point.

Yet another object of the present invention is to provide a fastener member having a novel point which length is minimized so as to lower material cost, reduce the weight of the fastener member and minimize interference problems with the point of the fastener member with other components.

A further object of the present invention is to provide a fastener member which lowers manufacturing cost as the fastener member threads and the point are roll threaded in one pass.

Briefly, and in accordance with the foregoing, the present invention discloses a fastener member, or other threaded member, and method of application for engagement with a female member having a threaded bore of a predetermined internal major diameter and a predetermined internal minor diameter. The female member may be, for example, a nut, a tapped bore in a workpiece or an internally threaded rivet staked to a workpiece.

The fastener member has a threaded shank portion and a point provided at the end thereof. The point includes an unthreaded radiused portion and a threaded transition portion between the shank portion and the radiused portion.

The radiused portion is defined by a spherical radius which emanates from a center point which is coincident with the centerline of the threaded shank portion and spaced a predetermined distance from the end of the fastener member. The radiused portion can be provided with a truncated end.

The threads which make up the transition portion are truncated. In one embodiment, which is the preferred embodiment, the major diameters of the threads of the transition portion are defined by a spherical radius that is the same as the spherical radius which defines the radiused portion and, as such, the major diameters of the threads of the transition portion gradually lessen between the opposite ends thereof. While a spherical radius which is the same as that for the radiused portion is preferably used to attain the truncation of the thread crests, it is to be understood that the truncation may be of varying degrees and radii depending upon the application for the fastener member. In another embodiment, the major diameters of the threads of the transition portion are defined by a generally spherical radius that approximates the spherical radius which defines the radiused portion and, as such, the major diameters of the threads of the transition portion gradually lessen between the opposite ends thereof.

To engage the fastener member with the female member, the point is inserted into the threaded bore in the female member. Rotational movement and an end load are applied to one of the fastener member or the female member to first attain alignment and then engage the threads on the transition portion with the threads in the threaded bore in the female member; thus once proper alignment has been achieved, engagement of the threads on the shank portion is achieved. The unthreaded radiused portion of the point will engage the crests of the internal thread and will allow and promote a pivoting movement of the fastener member, so that the fastener axis and the axis of the internally threaded bore are moved into general alignment. The truncated nature of the threads on the transition portion serve to promote ans assist in attaining alignment. These truncated threads can move past the internal or female threads without engagement that would hamper movement of the fastener member to an aligned position. The truncated nature of the threads also promotes threaded engagement with the internal threads. Engagement of the threads on the transition portion complete the alignment of the fastener member with the female member. As such, co-alignment of the fastener member and the internally threaded bore is attained prior to the engagement of the threads on the shank portion with the internal thread, thus promoting proper engagement and avoiding a cross-thread condition.

In most applications, the fastener member or the externally threaded member with the novel anti-cross-threading point design will be the driven component being engaged within the internally threaded bore of a stationary workpiece. This situation is illustrated in FIGS. 9–13 and 19–23 of the drawings. It is to be understood, however, that the externally threaded member having the novel anti-cross-threading point of the present invention can be the stationary component and the internally threaded member can be the driven component.

The minor diameters of the threads of the transition portion are defined by a spherical radius which may be larger than the spherical diameter of the radiused portion, and which emanates from points which are equidistantly offset from the centerline of the threaded shank portion a predetermined distance. The points are spaced the same predetermined distance away from the end of the fastener member as the center point which defines the radiused portion. As such, the minor diameters of the threads of the transition portion gradually lessen between the opposite ends thereof. The fastener member is formed by using a pair of specially designed rolling dies.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel point 20 for a fastener member 22 which promotes alignment with and facilitates engagement of the fastener member 22 in a threaded bore of a correspondingly threaded female member, such as a tapped bore 24 in a workpiece, in a nut 26, or in a rivet staked to a workpiece, and prevents the fastener member 22 from cross-threading upon insertion therein. The tapped bore 24 is a standard internally threaded bore which includes internal helical threads 28 having a major internal diameter 30 and a minor internal diameter 32. While a fastener member 22 is described and shown herein, it is to be understood that the novel point 20 of the present invention can be used on a stud or any other product with threads and is not limited to a fastener member.

Figure 1:
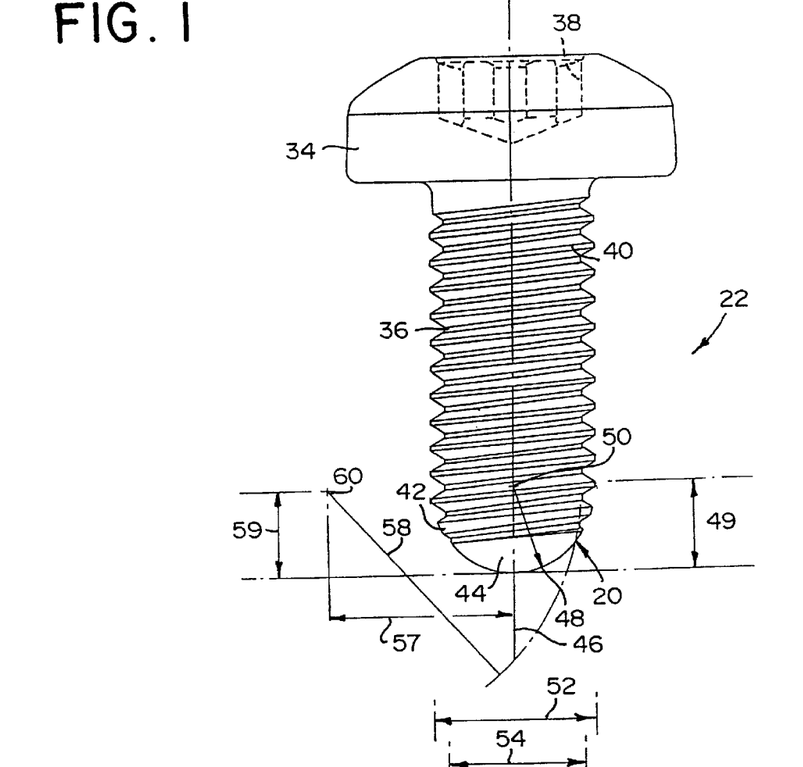
FIG. 1 is a side elevational view of a fastener member having a novel point configuration which incorporates the features of a first embodiment of the invention.
Figure 2:
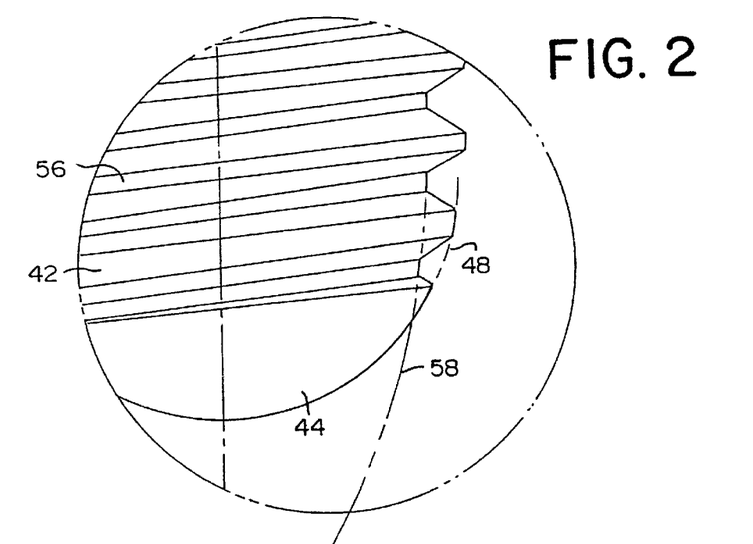
FIG. 2 is an enlarged, partial side elevational view of a portion of the point of the fastener member of FIG. 1.
Figure 14:
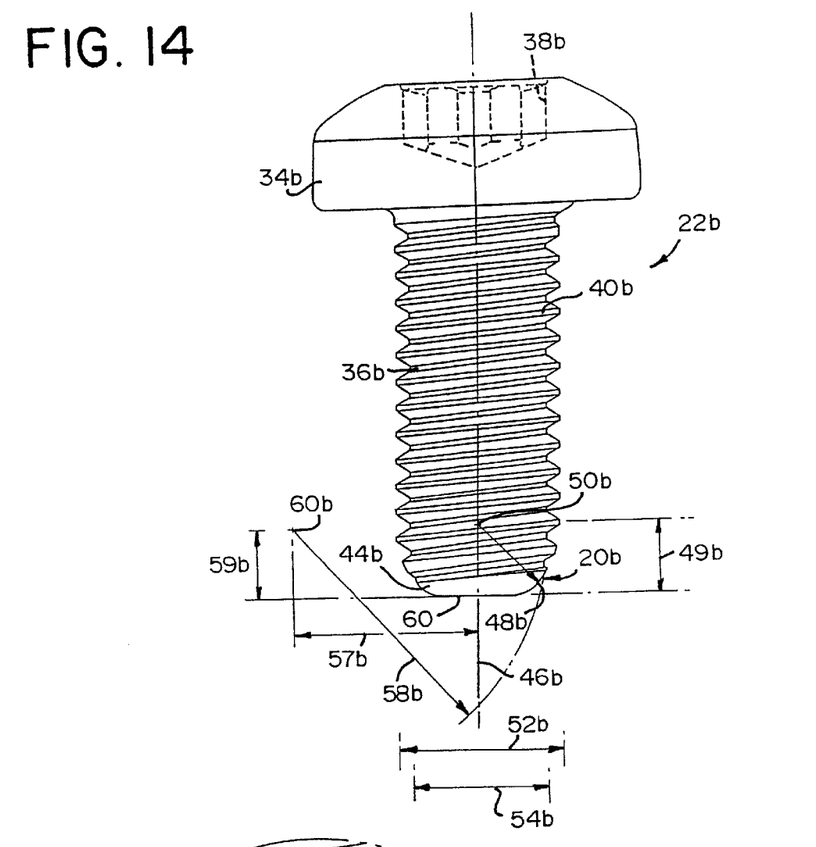
FIG. 14 is a side elevational view of a fastener member having a novel point configuration which incorporates the features of a second embodiment of the invention.
Figure 15:
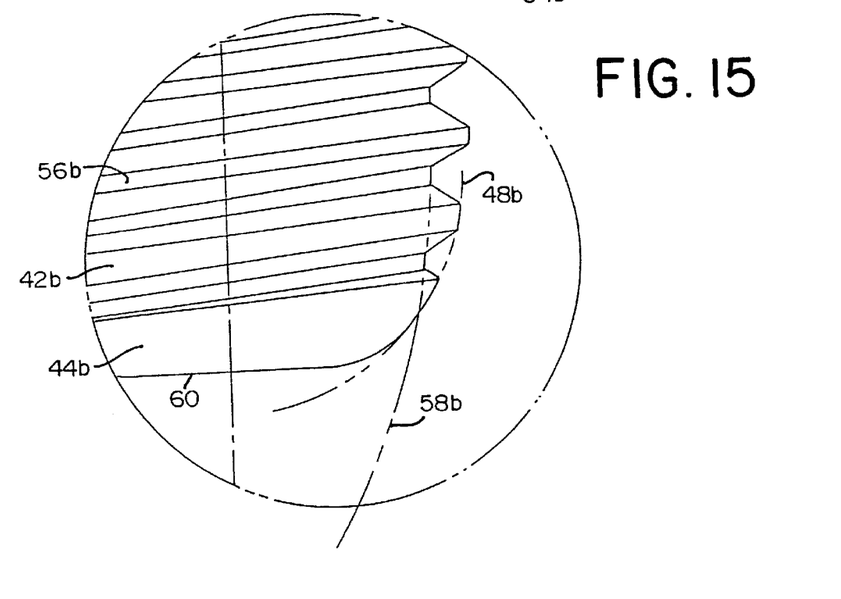
FIG. 15 is an enlarged, partial side elevational view of a portion of the point of the fastener member of FIG. 14.

A first embodiment of the novel point 20 on the fastener member 22 is shown in FIGS. 1 and 2. A second embodiment of the novel point 20b on the fastener member 22b is shown in FIGS. 14 and 15. Like elements in each embodiment are denoted with like reference numerals with the second embodiment having the suffix "b" after the reference numeral.

The generalities of each fastener member 22, 22b is described with respect to the first embodiment of the fastener member 22. Generally, the fastener member 22 of the present invention has a head 34 with at least a partially threaded shank portion 36 extending therefrom and the novel point 20 at the end of the threaded shank portion 36. A multilobular drive recess 38, preferably a TORX PLUS® recess, is provided in the head 30. The at least partially threaded shank portion 36 has a plurality of machine screw helical threads 40 thereon. The novel point 20 is provided on the opposite end of the threaded shank portion 36 from the head 34 and includes a threaded transition portion 42 extending from the end of the threaded shank portion 36 and an unthreaded radiused portion 44 at the opposite end of the threaded transition portion 42. A centerline of the fastener member 22 is shown at 46.

The unthreaded radiused portion 44 is generally hemispherical and is defined by a predetermined spherical radius 48. The spherical radius 48 emanates from a point 50 coincident with the centerline 46 of the fastener member 22 and is spaced a predetermined distance, shown as length 49, from the end of the fastener member 22.

The threads 40 on the threaded shank portion 36 define a predetermined major external diameter 52 and a minor diameter 54. The screw threads 40 on the threaded shank portion 36 are preferably standard machine screw threads having a 60° profile.

The threads 56 on the threaded transition portion 42 are continuous with or in helical alignment with the threads 40 on the threaded shank portion 36. The transition portion 42 has first and second opposite ends and the first end is connected to one of the ends of the threaded shank portion 36. The threads 56 on the transition portion 42 transition from a full thread form at the first end thereof to a partial thread form at the second end thereof.

The thread 56 at the first end of the transition portion 42 has a major surface or major diameter which is the same as the major diameter 52 of the threads 40 on the shank portion 36 and the thread at the second end of the transition portion 42 has a major surface or major diameter which is the smaller than the major diameter 52 of the threads 40 on the shank portion 36, with the major surfaces or major diameters of the threads 56 on the transition portion 42 gradually lessening between the first and second ends thereof. The major diameters or top surfaces of the threads 56 on the transition portion 42 are defined by the spherical radius 48 that defines the radiused portion 44 of the point 20. The threads 56 are truncated to form the spherical radius 48. While a spherical radius 48 which is the same as that for the radiused portion 44 is preferably used to attain the truncation of the thread crests in the transition portion 42, it is to be understood that the truncation may be of varying degrees and radii depending upon the application for the fastener member 22.

The thread 56 at the first end of the transition portion 42 has a minor surface or minor diameter which is the same as the minor diameter 54 of the threads 40 on the shank portion 36 and the threads 56 at the second end of the transition portion 42 has a minor surface or minor diameter which is the smaller than the minor diameter 54 of the threads 40 on the shank portion 36, with the minor surfaces or minor diameters of the threads 56 on the transition portion 42 gradually lessening between the first and second ends thereof. The minor diameters of the threads 56 on the transition portion 42 are defined by a spherical radius 58 which is different, and may be larger, than the spherical radius 48 which defines the radiused portion 44 and the major diameters of the transition portion 42. The spherical radius 58 which defines the minor diameters of the threads 56 emanates from points 60 (only one of which is shown) which are equidistantly offset from the centerline 46 of the fastener member 22 a predetermined distance, shown as length 57. The points 60 are spaced the same predetermined distance, shown as length 59, away from the end of the fastener member 20 as the distance which the center point 50 is spaced from the end of the fastener member 20.

The method of forming the fastener member 22 is now described with reference to FIGS. 3–5 and 6–7.

Figure 3:
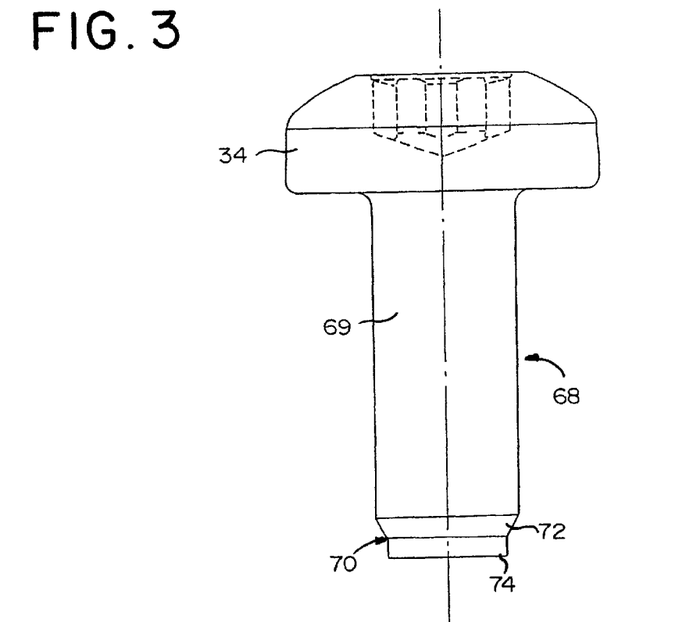
FIG. 3 is a side elevational view of a blank that can be used in the formation of the fastener member of the first embodiment.

As shown in FIG. 3, a headed, unthreaded blank 68 is used. Initially, the blank 68 includes the head 34 with a cylindrical shank extending therefrom. After machining, the blank 68 has a cylindrical portion 69 which has a dog point 70 at the free end thereof. The dog point 70 includes a tapered portion 72 which is connected to the cylindrical portion 69 and a cylindrical portion 74 which is connected to the opposite end of the tapered portion 72. The cylindrical portion 74 has a diameter which is smaller than the diameter of the cylindrical portion 69. The dog point 70 is formed by a commonly used forming process.

Figure 4:
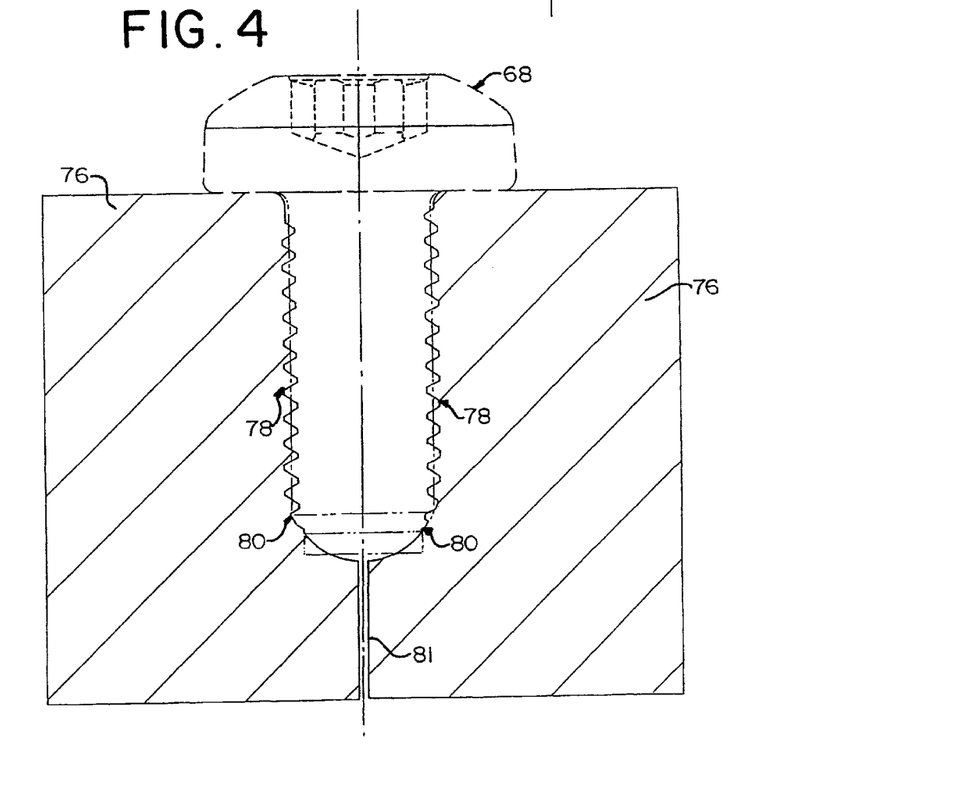
FIG. 4 is a cross-sectional view of a pair of specially designed rolling dies which are used to shape the blank of FIG. 3, and showing the blank of FIG. 3 in phantom lines.
Figure 5:
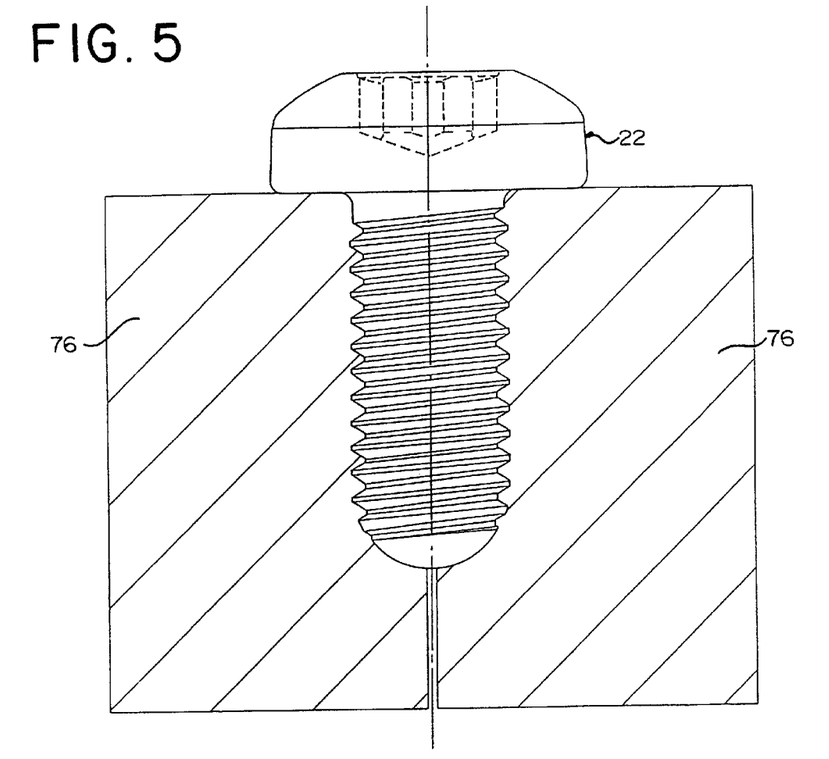
FIG. 5 is a cross-sectional view of the rolling dies of FIG. 4, with the finished fastener member of the first embodiment shown in full line.

To form the fastener member 22, the machined blank 68 is rolled between a pair of specially formed thread rolling dies 76. The internal configuration of each rolling die 76 includes a thread forming portion 78 and a radiused forming portion 80 at the end of the thread forming portion 78. In accordance with conventional thread rolling techniques, the size or depth of the grooves in the thread forming portion 78 increases along the width of each rolling die 76 so that the threads 40 on the shank 36 and the threads 56 on the transition portion 42 are gradually cold formed as the blank 68 is rolled between the rolling dies 76. In addition, the size of the radiused forming portion 80 of each rolling die 76 gradually decreases in size to gradually cold form the radiused portion 44. FIG. 4 shows the internal configuration of the rolling dies 76 proximate to the location where the fastener member 22 would be expelled from between the rolling dies 76. As shown in FIG. 4, the thread forming portion 78 of each rolling die 76 mirrors the shape of the threaded shank 40 and the threaded transition portion 42 as shown in FIG. 1. As such, the major diameter of the thread forming grooves in each rolling die 76 which are used to form the major diameter of the threaded transition portion 42 fall along a spherical radius which is the same as spherical radius 48, and the minor diameter of the thread forming grooves in each rolling die 76 which are used to form the minor diameter of the threaded transition portion 42 fall along a spherical radius which is the same as spherical radius 58. The radiused forming portion 80 mirrors the shape of the radiused portion 44 as shown in FIG. 1. A passage 81 is provided between the dies 76 proximate to the radiused forming portion 80 to allow any excess material to flow therethrough during the rolling process.

The fastener member 22 is rolled in one pass by using conventional thread rolling techniques—one die 76 is held stationary and the other die 76 is moved so that the blank 68 is rolled therebetween. The dog point 70 reduces the amount of material that is worked by the radiused forming portions 80 and relieves some pressure during the threading process.

Figure 6:
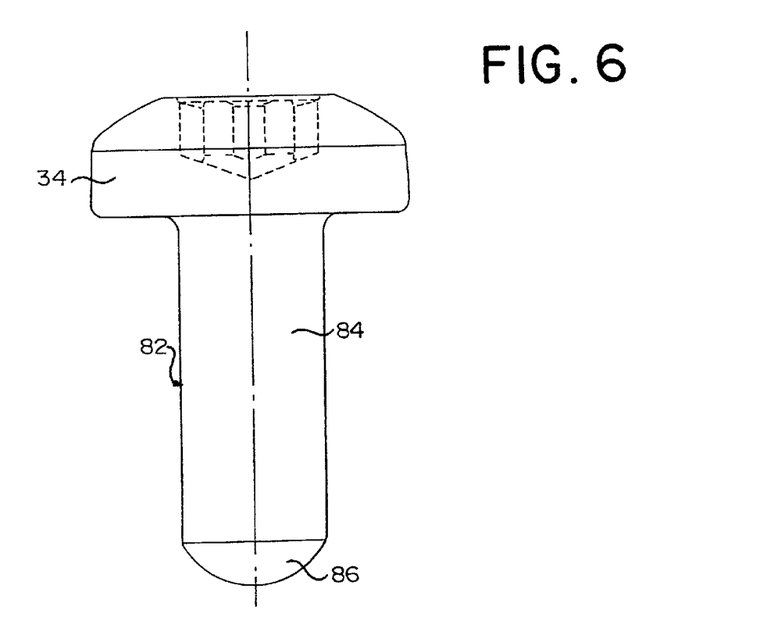
FIG. 6 is a side elevational view of an alternate blank that can be used in the formation of the fastener member of the first embodiment.
Figure 7:
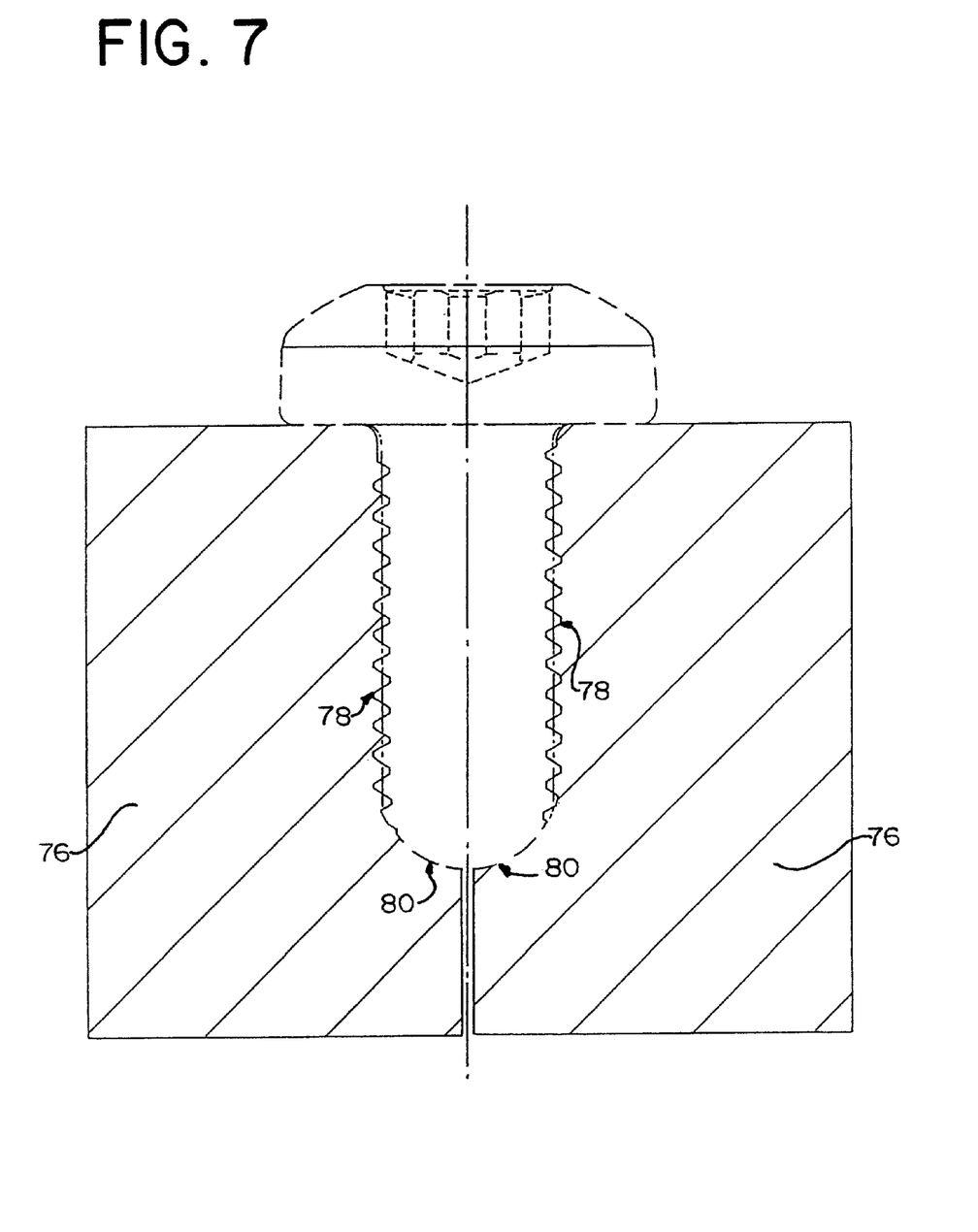
FIG. 7 is a cross-sectional view of the specially designed rolling dies of FIGS. 4 and 5 which are used to shape the blank of FIG. 6, and showing the blank of FIG. 6 in phantom lines.

Alternatively, as shown in FIG. 6, headed, unthreaded blank 82 can be used to form the fastener member 22 of FIGS. 1 and 2. Initially, the blank 82 includes the head 34 with a cylindrical shank extending therefrom. After machining, the blank 82 has a cylindrical portion 84 which has a radiused end portion 86 at the free end thereof. The radiused end portion 86 partially pre-forms the radiused portion 44 of the fastener member 22 before roll threading. The radiused end portion 86 can be made in a high-speed pointer or in other commonly used forming processes. The machined blank 82 is roll threaded between the pair of specially formed thread rolling dies 76 in the same manner as described above.

By using the above-described methods, the fastener member 22 can be economically and quickly manufactured. This improves productivity and lowers manufacturing costs.

Alternatively, the spherical radius shape of the major diameters of the threads 56 may be formed by truncating the threads 56 along the length of the transition portion 42. That is to say, the pointed crests of the threads 56 within the transition portion 42 are removed to form the radiused profile.

Attention is now invited specifically to FIGS. 14 and 15. The second embodiment of the fastener member 22*b* is identical to the first embodiment of the fastener member 22, except that the radiused portion 44*b* of the point 20*b* has a truncated end surface 60 and the points 50*b*, 60*b* are spaced a predetermined distance, shown by lengths 49*b*, 59*b*, away from the end of the truncated end surface 60.

Figure 16:
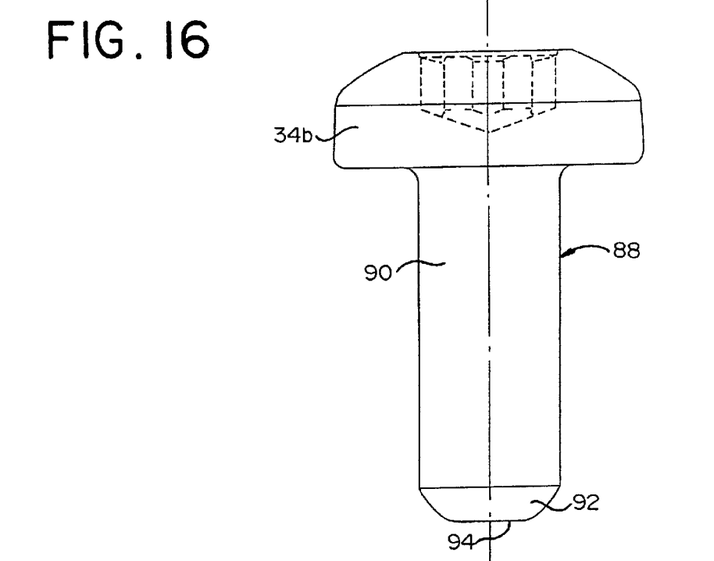
FIG. 16 is a side elevational view of a blank that is used in the formation of the fastener member of the second embodiment.
Figure 17:
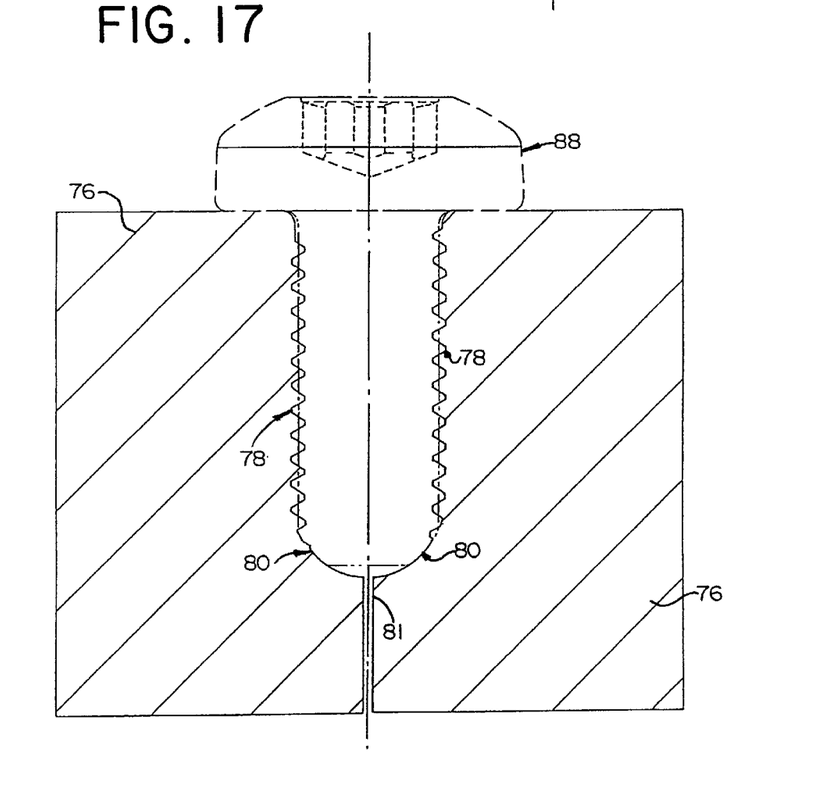
FIG. 17 is a cross-sectional view of the pair of specially designed rolling dies shown in FIGS. 4, 5 7, which are used to shape the blank of FIG. 16, and showing the blank of FIG. 16 in phantom lines.
Figure 18:
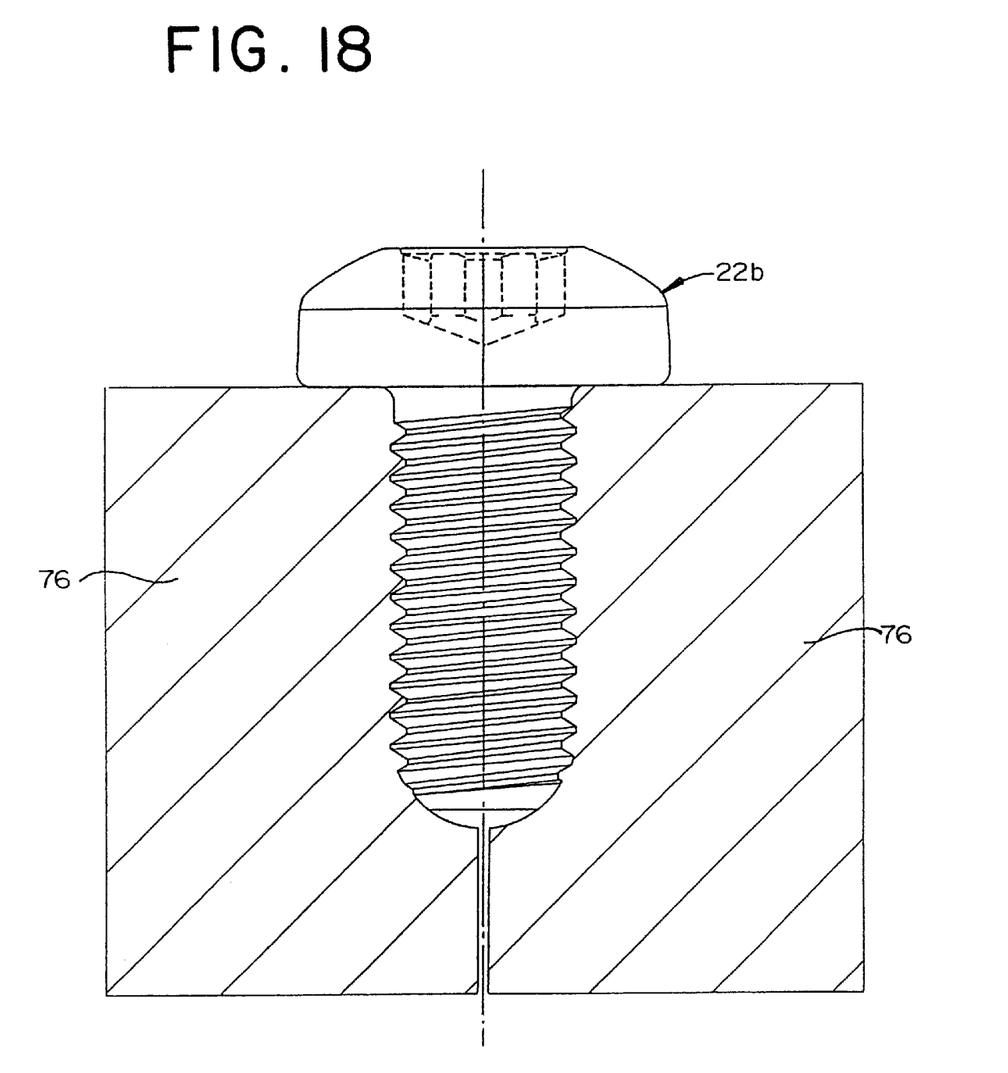
FIG. 18 is a cross-sectional view of the rolling dies of FIG. 17, with the finished fastener member of the second embodiment shown in full line.
Figure 19:
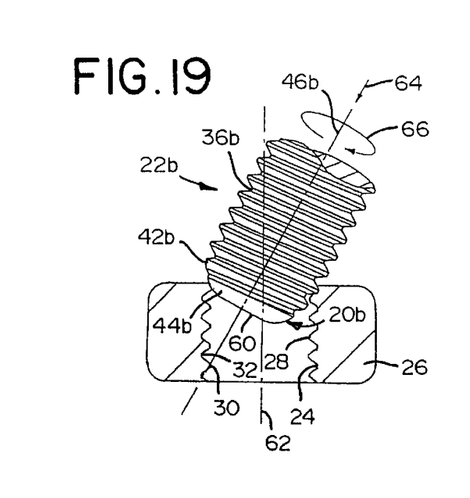
FIGS. 19–23 are side elevational views of the anti-cross-threading fastener member of the second embodiment and a cross-sectional view of a workpiece or nut in which the anti-cross-threading fastener member is being inserted which illustrates the steps in an off-angle installation of the anti-cross-threading fastener member into a tapped bore in the workpiece or nut.
Figure 20:
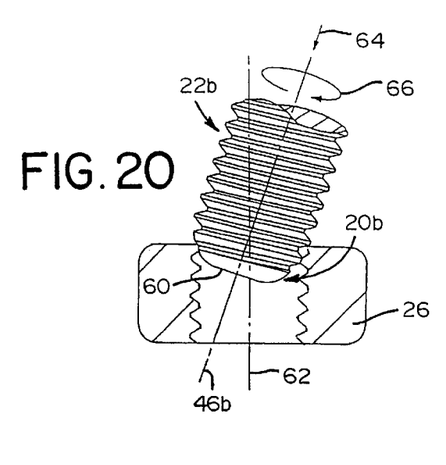
Figure 21:
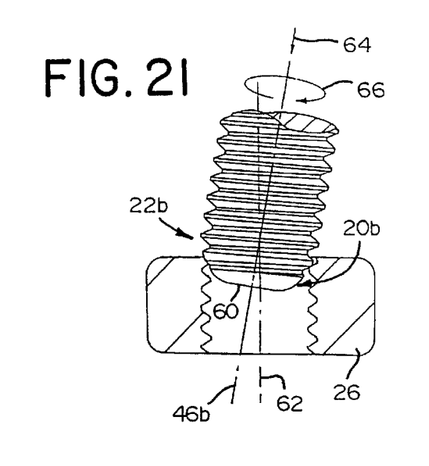
Figure 22:
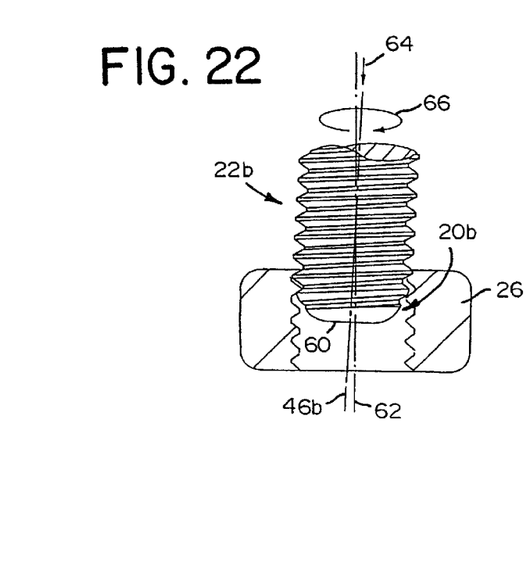
Figure 23:
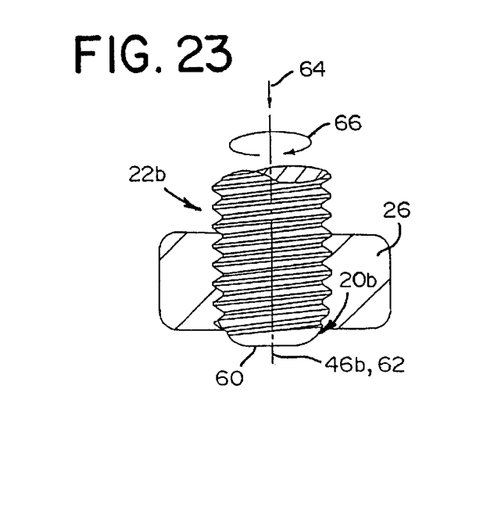

The fastener member 22*b* is formed in an identical manner to the embodiment of FIGS. 1 and 2, except that the machining of the headed, unthreaded blank 88, see FIG. 16, results in a different form prior to the blank 88 being roll threaded. Initially, the blank 88 includes the head 34*b* with a cylindrical shank extending therefrom. After machining, as shown in FIG. 16, the headed, unthreaded blank 88 has a cylindrical portion 90 which has a radiused end portion 92 at the free end thereof. The end 94 of the radiused end portion 92 is truncated. The radiused end portion 92 partially pre-forms the radiused portion 44*b* of the fastener member 22*b* before roll threading. The radiused end portion 92 with the truncated end 94 can be made in a high-speed pointer or in other commonly used forming processes. The blank 88 is roll threaded between the pair of specially formed thread rolling dies 76 in the same manner as described above.

Now that the specifics of the fastener member 22, 22*b* have been described, the method of inserting the fastener member 22, 22*b* into the stationary tapped bore 24 in the workpiece, the nut 26 or the rivet is described with regard to an off-angle condition shown in FIGS. 3–7. The engagement process is described with respect to the first embodiment of the fastener member 22 with the understanding that the method of engagement of the second embodiment of the fastener member 22*b* and the female member is effected in the same manner as shown in FIGS. 10–14.

The fastener member 22 self-aligns with the tapped bore 24 in the workpiece, in the nut 26 or in the rivet to correct an off-angle so as to promote alignment and prevent cross-threading of the fastener member threads 40 with the tapped bore threads 28. An off-angle installation of the fastener member 22 into the tapped bore 24 results when the centerline 46 of the fastener member 22 is at an angle to the centerline 62 of the tapped bore 24.

As shown in FIG. 3, the radiused portion 44 and the radiused profile threads 56 on the transition portion 42 contact the threads 28 inside the tapped bore 24. The female member 26 which has the tapped bore 24 therein remains stationary during this engagement process (unless it is being rotated and then the fastener member 22 remains stationary). The centerline 46 of the fastener member 22 begins to align, because of a moment action caused by the end load, shown by arrow 64, placed on the fastener member 22, with the centerline 62 of the tapped bore 24 by rotating or pivoting around the radiused portion 44 because of contact with the threads 28 in the tapped bore 24. More specifically, the radiused portion 44 engages the crests of the female threads 28 producing a tendency for the fastener member 22 to rock or pivot towards the aligned position, due to the application of the end load 64 and the force vector produced by the end load 64. The truncation of the threads 56 in the transition portion 42 allows the transition portion 42 to ride over or past the threads 28 and to prevent the transition portion 42 from hanging up on the threads 28.

The moment action continues to cause the point 20 to move further into the tapped bore 24. As the point 20 moves further into the tapped bore 24, the threads 56 on the transition portion 42 engage with the threads 28 in the tapped bore 24 and the centerline 46 of the fastener member 22 and the centerline 62 of the tapped bore 24 move into alignment with each other. The point 20 is disposed inside the tapped bore 24 before thread engagement between the threads 40 on the threaded shank portion 36 and the threads 28 in the tapped bore 24. Once the centerline 46 of the fastener member 22 aligns with the centerline 62 of the tapped bore 24 as a result of the transition portion 42 engagement with the threads 28 in the tapped bore 24, the fastener member 22 is driven into the tapped bore 24 by rotation shown by arrow 66 and application of the end load shown by arrow 64. Because the centerlines 46, 62 are aligned, misalignment that causes cross-threading is greatly reduced. This provides for a smooth insertion of the fastener member 22 into the tapped bore 24 which reduces the chances of a wedging action between the threads 28, 40.

When the novel point 20 is presented to the tapped bore 24 in an large off-angle condition as shown in the drawings, the internal thread 28 "sees" the point 20 as being spherical because of the truncated major diameter threads on the transition portion 42. The point 20 does not cross-thread because the crests of the threads 28 ride over the truncated major diameter threads of the transition portion 42. At a less off-angle condition, the truncated major diameter threads of the transition portion 42 establish a partial engagement with the internal threads 28 which assists in aligning the fastener member 20 with respect to the internal threads 28.

While the insertion process has been described with respect to the first embodiment of the fastener member 22, as shown in FIGS. 10–14, the second embodiment of the fastener member 22b is inserted into the tapped bore 24 in the same manner.

Figure 8:
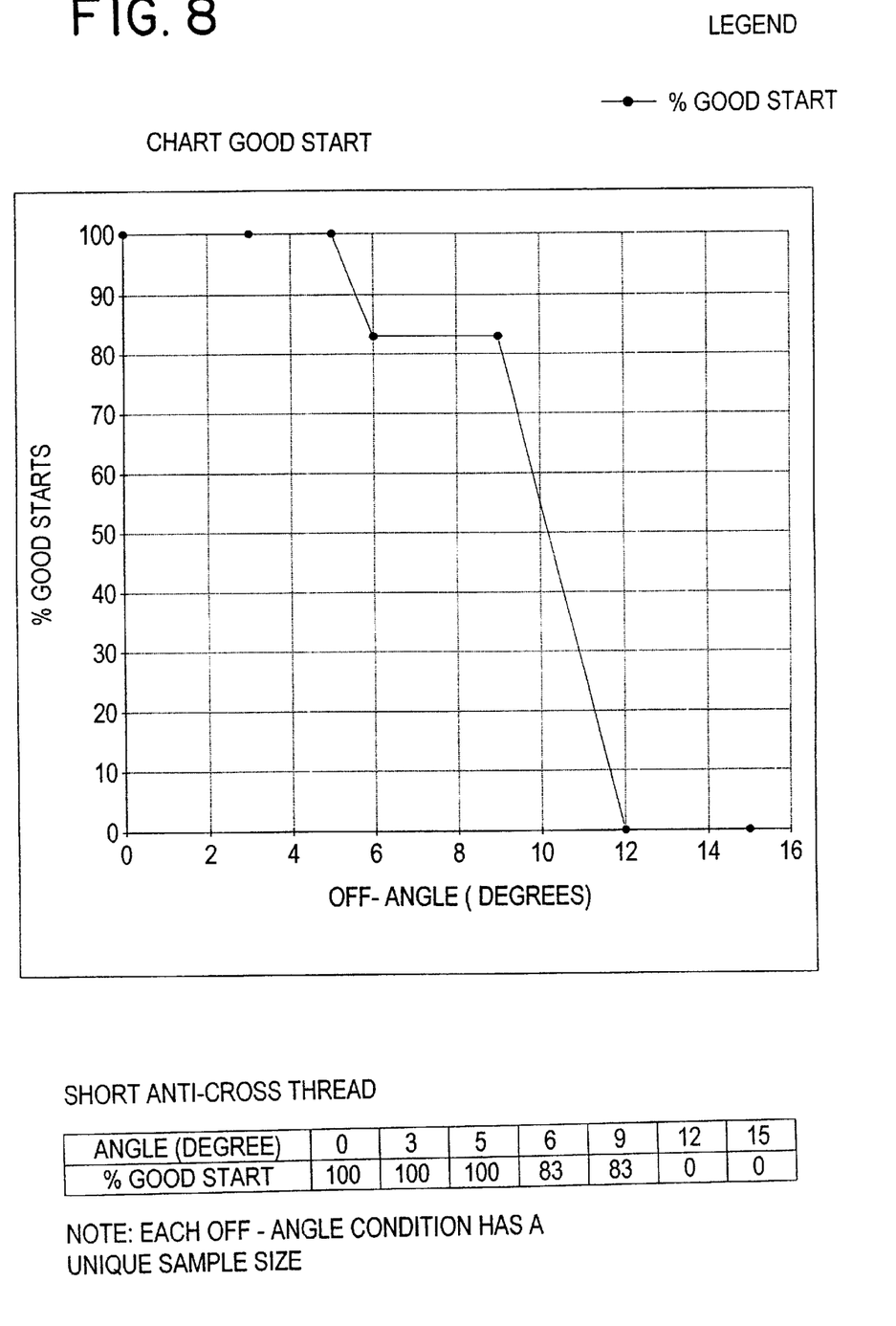
FIG. 8 are charts showing test results of the first embodiment of the fastener member.
Figure 9:
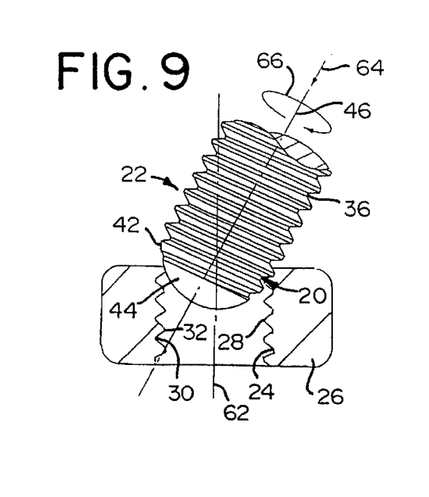
FIGS. 9–13 are side elevational views of the anti-cross-threading fastener member of the first embodiment and a cross-sectional view of a workpiece or nut in which the anti-cross-threading fastener member is being inserted which illustrates the steps in an off-angle installation of the anti-cross-threading fastener member into a tapped bore in the workpiece or nut.
Figure 10:
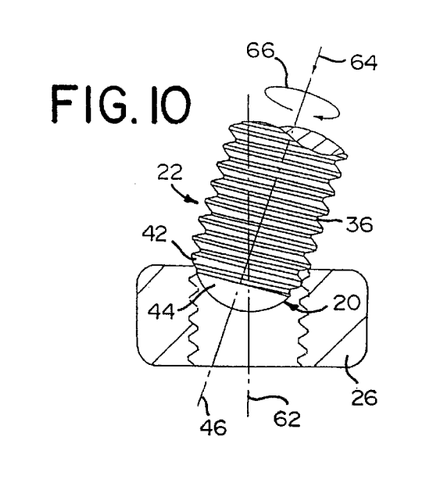
Figure 11:
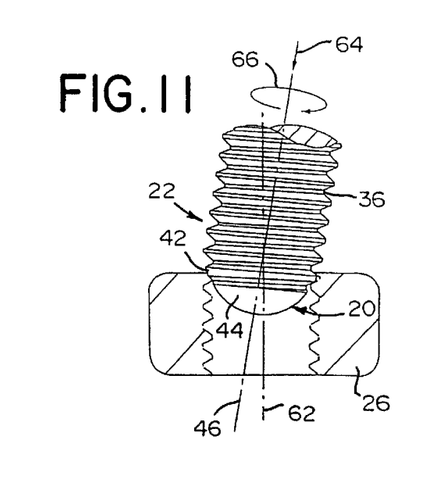
Figure 12:
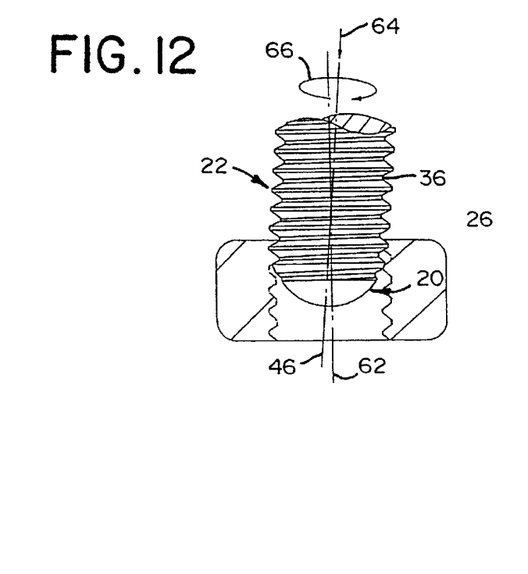
Figure 13:
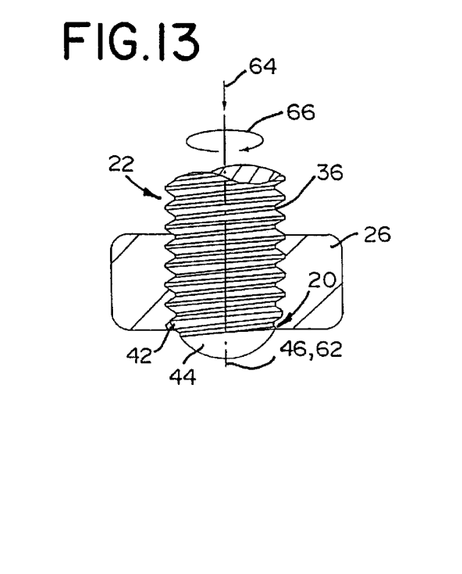

FIG. 8 are charts which show the test results of the fastener member 22 of FIGS. 1 and 2. The chart shows the percent of fastener members 22 from a thirty piece sampling that had a "Good Start" at various angles of presentation of the fastener member 22 to the female member. A "Good Start" is defined as a fastener member 22 that properly engages the female member within two seconds of contact.

The length of the point 20, 20b is short versus prior art fastener members and is only slightly longer than a standard machine screw point length. The short point length allows for weight savings versus prior art fastener members. Furthermore, standard machine screws can be replaced easier because of the short point length of the present invention versus prior art points. The short point of the present invention offers savings versus prior art designs by lowering material cost and by weight reduction. In addition, this minimizes interference problems with the point 20, 20b of the fastener member 22, 22b with other components and allows for improved performance in thin nut applications. Because of the radiused portion 44, 44b and the transition portion 42, 42b, the point 20, 20b will not damage the internal thread 28 during installation unlike a straight cutoff point such as a dog point.

The point design of the present invention can be adapted for threaded tubular products. In addition, the point design of the present invention can be adapted for tapered threads, such as NPTF pipe plugs.

While preferred embodiments of the present invention are shown and described, it is envisioned that those skilled in the art may devise various modifications of the present invention without departing from the spirit and scope of the appended claims.

The invention claimed is:

1. A method of forming a member comprising:
providing a blank having a head and a cylindrical shank extending therefrom;
providing a pair of rolling dies, each said die having a threaded portion, a threaded transition portion which has at least one truncated thread thereon and an unthreaded radiused portion, said threaded transition portion being between said threaded portion and said unthreaded radiused portion;
machining an end of said cylindrical shank to form a predetermined form thereon and to define a machined blank; and
roll threading said machined blank using said rolling dies, whereupon a first portion of said machined blank which is rolled between said threaded portion of each said rolling dies is threaded, a second portion which is rolled between said transition portion of each said rolling dies is threaded, said threaded transition portion forming threads having major surfaces which have a substantially spherical profile, and a third portion of said machined blank which is rolled between said unthreaded radiused portion of each said rolling dies remains unthreaded.

2. A method as defined in claim 1, wherein during said step of machining an end of said cylindrical shank to form a predetermined form thereon, said predetermined form is a dog point.

3. A method as defined in claim 1, wherein during said step of machining an end of said cylindrical shank to form a predetermined form thereon, said predetermined form includes a radiused portion.

* * * * *